United States Patent
Kalhan et al.

(10) Patent No.: US 11,683,796 B2
(45) Date of Patent: *Jun. 20, 2023

(54) ASSIGNMENT OF COMMUNICATION RESOURCES IN AN UNLICENSED FREQUENCY BAND TO EQUIPMENT OPERATING IN A LICENSED FREQUENCY BAND

(71) Applicant: Kyocera Corporation, Kyoto (JP)

(72) Inventors: Amit Kalhan, San Diego, CA (US); Henry Chang, San Diego, CA (US)

(73) Assignee: Kyocera Corporation, Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/736,385

(22) Filed: May 4, 2022

(65) Prior Publication Data
US 2022/0264588 A1 Aug. 18, 2022

Related U.S. Application Data

(63) Continuation of application No. 15/311,782, filed as application No. PCT/US2015/032272 on May 22, 2015, now Pat. No. 11,363,615.
(Continued)

(51) Int. Cl.
*H04W 72/12* (2023.01)
*H04W 76/14* (2018.01)
(Continued)

(52) U.S. Cl.
CPC ...... *H04W 72/1215* (2013.01); *H04B 7/2615* (2013.01); *H04L 5/001* (2013.01);
(Continued)

(58) Field of Classification Search
CPC ... H04W 76/15; H04W 76/14; H04W 76/023; H04W 88/06; H04W 88/08; H04W 24/00;
(Continued)

(56) References Cited

U.S. PATENT DOCUMENTS

2006/0040666 A1* 2/2006 Narasimha ............ H04W 36/30
455/436
2008/0112340 A1 5/2008 Luebke
(Continued)

FOREIGN PATENT DOCUMENTS

EP 2605580 A1 6/2013
EP 2696530 A2 2/2014
(Continued)

OTHER PUBLICATIONS

Samsung; "Physical Channel Design for Scheduling Assignment," R1-141851; 3GPP TSG RAN WG1 Meeting #76bis; Mar. 31-Apr. 4, 2014; Shenzhen, China.
(Continued)

*Primary Examiner* — Un C Cho
*Assistant Examiner* — Rasha K Fayed

(57) ABSTRACT

Communication equipment communicating in a licensed frequency band identifies unused unlicensed communication resources within an unlicensed frequency band. The communication equipment uses the identified unlicensed communication resources to communicate within the unlicensed frequency band. In some circumstances, the unused unlicensed communication resources are identified based on resource information received from a base station where the resource information identifies unlicensed communication resources that will be used by the base station. In other circumstances, the unused unlicensed communication resources are identified based on frequency band measurements of the unlicensed frequency band over an observation time duration longer than a sensing time duration used by unlicensed equipment using the unlicensed frequency band.

8 Claims, 8 Drawing Sheets

Related U.S. Application Data

(60) Provisional application No. 62/002,037, filed on May 22, 2014, provisional application No. 62/002,041, filed on May 22, 2014.

(51) Int. Cl.

| | | |
|---|---|---|
| *H04W 4/70* | (2018.01) | |
| *H04L 5/00* | (2006.01) | |
| *H04L 27/00* | (2006.01) | |
| *H04W 74/08* | (2009.01) | |
| *H04W 84/12* | (2009.01) | |
| *H04B 7/26* | (2006.01) | |
| *H04W 72/21* | (2023.01) | |
| *H04W 72/23* | (2023.01) | |
| *H04W 72/541* | (2023.01) | |
| *H04W 16/14* | (2009.01) | |
| *H04W 24/10* | (2009.01) | |
| *H04W 72/0453* | (2023.01) | |
| *H04W 72/0446* | (2023.01) | |
| *H04W 24/08* | (2009.01) | |
| *H04W 72/02* | (2009.01) | |
| *H04W 88/06* | (2009.01) | |
| *H04W 88/08* | (2009.01) | |

(52) U.S. Cl.
CPC ........... *H04L 27/0006* (2013.01); *H04W 4/70* (2018.02); *H04W 16/14* (2013.01); *H04W 24/08* (2013.01); *H04W 24/10* (2013.01); *H04W 72/02* (2013.01); *H04W 72/0446* (2013.01); *H04W 72/0453* (2013.01); *H04W 72/21* (2023.01); *H04W 72/23* (2023.01); *H04W 72/541* (2023.01); *H04W 74/0808* (2013.01); *H04W 76/14* (2018.02); *H04W 84/12* (2013.01); *H04L 5/0048* (2013.01); *H04W 74/0866* (2013.01); *H04W 88/06* (2013.01); *H04W 88/08* (2013.01)

(58) Field of Classification Search
CPC ..... H04W 24/10; H04W 24/08; H04W 84/20; H04W 84/12; H04W 72/082; H04W 72/0453; H04W 72/1215; H04W 72/0413; H04W 72/042; H04W 72/0446; H04W 72/1284; H04W 72/02; H04W 72/1231; H04W 4/005; H04W 4/70; H04W 16/14; H04W 16/28; H04W 74/0808; H04W 74/0866; H04W 28/26; H04W 28/18; H04L 5/0048; H04L 5/001; H04L 5/0023; H04L 5/0053; H04L 5/0055; H04L 5/005; H04L 5/0078; H04L 5/0044; H04L 25/0224; H04L 27/0006; H04L 27/2657; H04L 27/2662; H04B 7/2615; H04B 7/0456; H04B 7/0452; H04B 7/0626
See application file for complete search history.

(56) References Cited

U.S. PATENT DOCUMENTS

| | | | |
|---|---|---|---|
| 2008/0123615 A1 | 5/2008 | Hoshino et al. | |
| 2008/0171568 A1 | 7/2008 | Choi et al. | |
| 2008/0219201 A1* | 9/2008 | Challapali | H04W 24/10 370/312 |
| 2008/0259846 A1 | 10/2008 | Gonikberg et al. | |
| 2008/0298450 A1 | 12/2008 | Zhang et al. | |
| 2009/0180429 A1* | 7/2009 | Stevens | H04L 5/0023 370/329 |
| 2010/0029216 A1* | 2/2010 | Jovicic | H04B 7/2615 455/68 |
| 2010/0188985 A1 | 7/2010 | Ishii et al. | |
| 2010/0246506 A1 | 9/2010 | Krishnaswamy et al. | |
| 2011/0312331 A1* | 12/2011 | Hakola | H04W 72/085 455/452.2 |
| 2012/0099466 A1 | 4/2012 | Aoyama et al. | |
| 2012/0202519 A1* | 8/2012 | Bertagna | H04W 64/00 455/456.1 |
| 2012/0307869 A1* | 12/2012 | Charbit | H04W 72/082 375/132 |
| 2013/0083783 A1 | 4/2013 | Gupta et al. | |
| 2013/0143502 A1 | 6/2013 | Kazmi et al. | |
| 2013/0195073 A1* | 8/2013 | Chen | H04L 5/0023 370/331 |
| 2013/0293391 A1* | 11/2013 | Osterloh | G01D 4/002 340/870.03 |
| 2013/0294356 A1* | 11/2013 | Bala | H04W 16/14 370/329 |
| 2013/0336156 A1 | 12/2013 | Wei et al. | |
| 2013/0338855 A1 | 12/2013 | Mason et al. | |
| 2014/0031054 A1 | 1/2014 | Zou et al. | |
| 2014/0036818 A1 | 2/2014 | Koskela | |
| 2014/0036853 A1 | 2/2014 | Kim et al. | |
| 2014/0112289 A1 | 4/2014 | Kim et al. | |
| 2014/0301351 A1* | 10/2014 | Gao | H04W 74/08 370/329 |
| 2015/0071193 A1 | 3/2015 | Seo | |
| 2015/0131536 A1 | 5/2015 | Kaur et al. | |
| 2015/0222340 A1 | 8/2015 | Nagata et al. | |
| 2015/0264699 A1* | 9/2015 | Fwu | H04L 5/0091 370/329 |
| 2016/0330641 A1 | 11/2016 | Zhang et al. | |
| 2016/0338054 A1* | 11/2016 | Oh | H04W 74/0841 |
| 2017/0055263 A1* | 2/2017 | Tomeba | H04L 5/0048 |
| 2017/0086214 A1* | 3/2017 | Kalhan | H04W 72/0413 |
| 2017/0111889 A1* | 4/2017 | Li | H04W 74/08 |
| 2018/0323815 A1* | 11/2018 | Beadles | H04W 24/08 |

FOREIGN PATENT DOCUMENTS

| | | |
|---|---|---|
| JP | 2001-339760 A | 12/2001 |
| JP | 2012-248939 A | 12/2012 |
| WO | 2013-133871 A1 | 9/2013 |
| WO | 2013-155672 A1 | 10/2013 |
| WO | 2013-179095 A1 | 12/2013 |

OTHER PUBLICATIONS

Kyocera, "Design Details of Scheduling Assignments", R1-141459; 3GPP TSG RAN WG1 Meeting #76bis; Mar. 31-Apr. 4, 2014; Shenzhen, China.

* cited by examiner

ASSIGNMENT OF COMMUNICATION RESOURCES IN AN UNLICENSED FREQUENCY BAND TO EQUIPMENT OPERATING IN A LICENSED FREQUENCY BAND

CLAIM OF PRIORITY

The present application is a continuation of and claims priority to U.S. application Ser. No. 15/311,782, entitled "ASSIGNMENT OF COMMUNICATION RESOURCES IN AN UNLICENSED FREQUENCY BAND TO EQUIPMENT OPERATING IN A LICENSED FREQUENCY BAND" and filed on Nov. 16, 2016; which is a national stage application of PCT/US2015/032272, entitled "ASSIGNMENT OF COMMUNICATION RESOURCES IN AN UNLICENSED FREQUENCY BAND TO EQUIPMENT OPERATING IN A LICENSED FREQUENCY BAND" and filed on May 22, 2015; which claims priority to Provisional Application No. 62/002,037, entitled "METHODS OF RESERVING RESOURCES ON UNLICENSED BANDS" and filed May 22, 2014; and to Provisional Application No. 62/002,041, entitled "METHODS OF COORDINATING LTE TRANSMISSIONS ON UNLICENSED BANDS" and filed May 22, 2014; all of which assigned to the assignee hereof, and hereby expressly incorporated by reference.

RELATED PATENT APPLICATIONS

The present application claims is related to PCT Patent Application No. PCT/US2015/032257 entitled "UNLICENSED FREQUENCY BAND WITH LICENSED FREQUENCY BAND TIMING", PCT Patent Application No. PCT/US2015/032265 entitled "COMMUNICATION RESOURCE SCHEDULING FOR DEVICE-TO-DEVICE (D2D) COMMUNICATION IN AN UNLICENSED FREQUENCY BAND", and PCT Patent Application No. PCT/US2015/032279 entitled "PHYSICAL CHANNEL STRUCTURE FOR COMMUNICATION IN UNLICENSED FREQUENCY BAND", all filed concurrently with this application, assigned to the assignee hereof, and hereby expressly incorporated by reference.

FIELD

This invention generally relates to wireless communications and more particularly to assigning unused communication resources in an unlicensed frequency band equipment operating in a licensed frequency band.

BACKGROUND

The frequency spectrum used by a particular communication system may be licensed or unlicensed. Licensed frequency spectrum (frequency band) is licensed to a system operator by a government agency such as the Federal Communications Commission (FCC). An example of such licensed spectrum includes frequency bands used for cellular communication. An unlicensed frequency band is any portion of frequency spectrum that does not require a license from the government agency to communicate with the unlicensed frequency band. Equipment operating within the unlicensed band, however, typically must adhere to regulations and/or communication standards. An example of unlicensed frequency spectrum includes frequency bands used for Institute of Electrical and Electronics Engineers (IEEE) 802.11 communication.

SUMMARY

Communication equipment communicating in a licensed frequency band identifies unused unlicensed communication resources within an unlicensed frequency band. The communication equipment uses the identified unlicensed communication resources to communicate within the unlicensed frequency band. In some circumstances, the unused unlicensed communication resources are identified based on resource information received from a base station where the resource information identifies unlicensed communication resources that will be used by the base station. In other circumstances, the unused unlicensed communication resources are identified based on frequency band measurements of the unlicensed frequency band over an observation time duration longer than a sensing time duration used by unlicensed equipment using the unlicensed frequency band.

DETAILED DESCRIPTION

Figure 1:
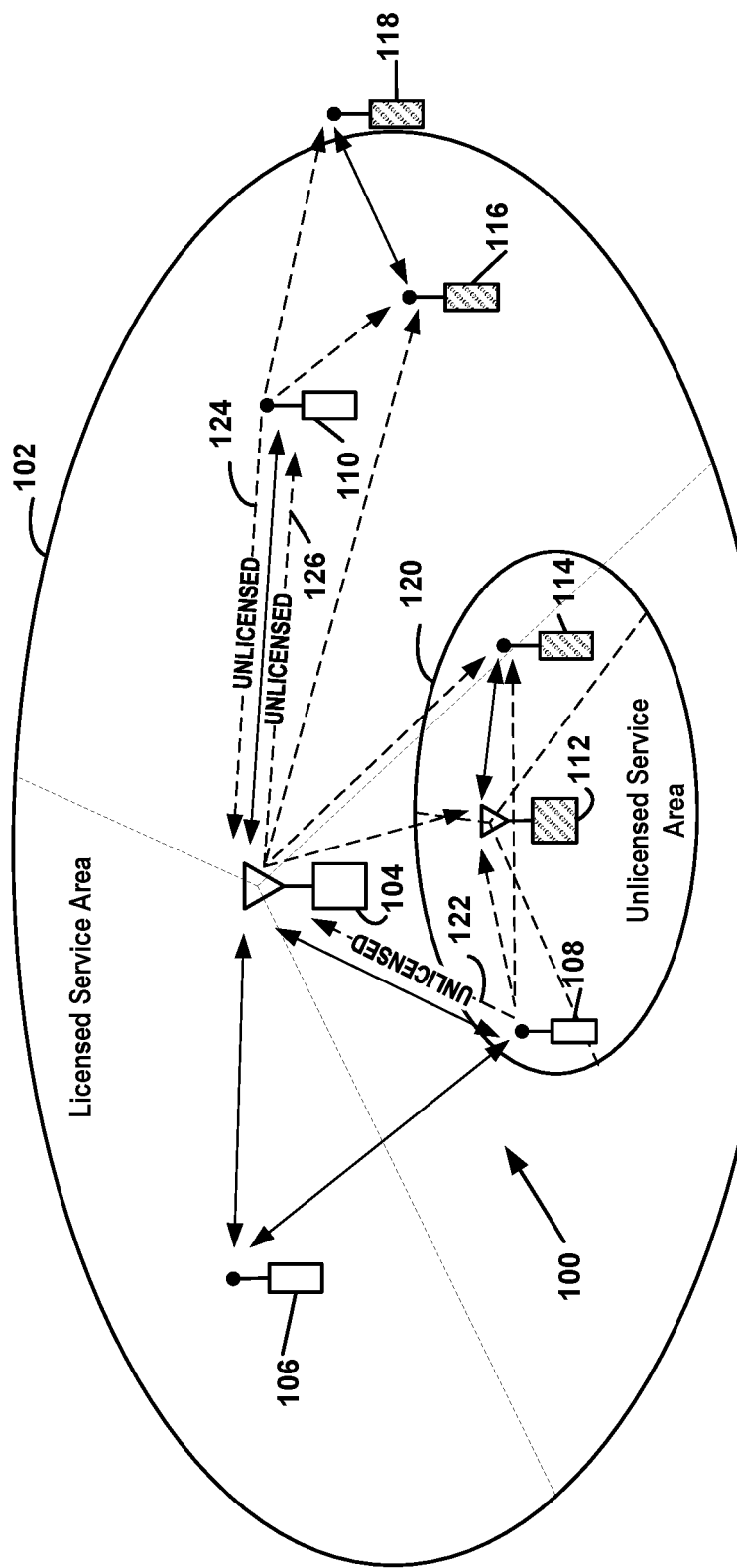
FIG. 1 is a block diagram of a licensed communication system having a licensed service area where communication equipment communicates using an unlicensed frequency band.

FIG. 1 is a block diagram of a licensed communication system 100 having a licensed service area 102 where communication equipment 104, 106, 108, 110 communicates using an unlicensed frequency band. The licensed communication system 100 may be any communication system that uses a portion of frequency spectrum (frequency band) that is licensed to the system operator by a government agency such as the Federal Communications Commission (FCC). For the examples discussed herein, the licensed communication system 100 is a cellular system that operates in accordance with at least one revision of The Third-Generation Partnership Project Long-Term Evolution (3GPP LTE)

communication specification. Examples of licensed frequency bands include Advanced Wireless Service (AWS) 4G frequencies in the range of 1,710-1,755 and 2,110-2,155 MHz. The unlicensed frequency band is any portion of frequency spectrum that does not require a license from the government agency to communicate with the unlicensed frequency band. Equipment operating within the unlicensed band, however, typically must adhere to regulations and/or communication standards. Examples of unlicensed bands include frequency bands used for IEEE 802.11 standards that comply with the FCC Rules and Regulations such as WiFi, Bluetooth, and Zigbee. For the example FIG. 1, an eNB 104 provides wireless service to user equipment (UE) devices 106, 108, 110 within a geographical service area (licensed service area) 102 using one or more licensed frequency bands.

A cellular communication system is typically required to adhere to a communication standard or specification. The communication specification defines physical channel structure that at least includes a data channel and a control channel for uplink and downlink transmissions and specifies at least some timing and frequency parameters for physical downlink control channels from a base station to a wireless communication device. The Third-Generation Partnership Project Long-Term Evolution (3GPP LTE) communication specification is a specification for systems where communication stations (eNodeBs) provide service to wireless communication devices (UE devices) using orthogonal frequency-division multiple access (OFDMA) on the downlink and single-carrier frequency-division multiple access (SC-FDMA) on the uplink. Although the techniques described herein may be applied in other types of communication systems, the exemplary systems discussed herein operate in accordance with an FDD 3GPP LTE communication specification.

The eNB 104 can be any type of communication station or transceiver station or radio head and may be referred to as a base station, eNodeB, fixed station, access point, and other terms. The eNB 104 may be connected within a network of several other eNBs through a backhaul (not shown in FIG. 1). The UE devices 106, 108, 110 are any type of user devices and are sometimes referred to by other terms such as, for example, handset, phone, smartphone, mobile device, portable device, and modems. Communication using the licensed band may include downlink transmissions from the eNB to UE devices, uplink communication from UE devices to the eNB, and device-to-device (D2D) communication between two or more UE devices. The bi-directional arrows between the UE devices and the eNB in FIG. 1 represent a connection and/or an association but do not necessarily indicate an ongoing communication session. For example, a UE device may be registered to the eNB and receiving control information but not exchanging data with the eNB.

The licensed communication equipment communicates in the licensed frequency band using a licensed physical channel structure. The physical channel structure for downlink communication may differ from the physical channel structure for uplink communication. The licensed physical channel structure partitions time and frequency to define a plurality of time-frequency resources (resource elements). Sets of resources are allocated for a particular type of communication. For example, different sets of time-frequency communication resources can be allocated for data, control, and reference signals. For the examples herein, the licensed physical channel structure adheres to at least one revision of the 3GPP LTE communication specification.

Other unlicensed devices 112, 114, 116, 118 within the licensed service area 102 use an unlicensed frequency band for communication. The unlicensed devices 112, 114, 116, 118 may include access points 112 providing service to mobile devices 114 and devices 116, 118 operating in device-to-device communication scenarios. The unlicensed communications may be ad hoc communication scenarios and may be bidirectional or one way. Accordingly, the unlicensed devices 112, 114, 116, 118 may include various types of devices and equipment. For the example of FIG. 1, an access point 112 provides wireless service to mobile devices 114 within an unlicensed service area 120 and two other devices 116, 118 communicate directly with each other using the unlicensed frequency band.

For the examples herein, the licensed equipment 104, 106, 108, 110 uses an unlicensed physical channel structure for communication in the unlicensed frequency band where the unlicensed physical channel structure at least has the same time and frequency divisions as the licensed physical channel structure. Although the frequencies are different, each frequency division in the unlicensed structure corresponds to a frequency division in the licensed structure such that the communication resource elements in the unlicensed structure correlate to the communication resource elements in the licensed structure. A reference set of communication resource elements for transmission of reference signals have the same symbol times as a reference set of resource elements allocated in the licensed physical channel structure for reference signals. Other arrangements may be used in some circumstances. An example of physical channel structure related to licensed and unlicensed communication is discussed in PCT Patent Application No. PCT/US2015/032279, entitled "Physical Channel Structure For Communication In Unlicensed Frequency Band", and filed concurrently with this application.

For the examples herein, the licensed equipment 104, 106, 108, 110 uses the unlicensed frequency band for communication at times determined to avoid interference or at least to result in a tolerable level of interface with communication between unlicensed devices and, in some situations, other licensed devices using the unlicensed frequency band. When it is determined that unlicensed equipment is operating nearby, the unlicensed frequency band is monitored prior to transmission to determine if the band is currently in use. If it is determined that the band is not in use, the licensed equipment transmits signals within the unlicensed frequency band. The monitoring procedure prior to transmission is the same, or at least similar to the sensing/back off procedures employed by conventional devices operating in the unlicensed frequency band. The techniques may be required by rules or standards governing operation in the unlicensed frequency band. For the example of FIG. 1, dashed arrows indicate transmissions within the unlicensed band by the licensed system equipment. In some scenarios, UE devices 108, 110 transmit signals 122, 124 to the eNB 104 within the unlicensed frequency band. The signals 122, 124 reach the unlicensed devices that are sufficiently close depending on the power level of the signal. For example, the signal 122 from one UE device 122 may reach the access point 112 and the unlicensed mobile device 114 and the signal 124 from second UE device 110 may reach the unlicensed mobile device 116, 118. In another scenario, the eNB 104 transmits a signal 126 within the unlicensed frequency band to one or more UE devices 110 and the signal 126 may reach the unlicensed mobile devices 116, 118. The unlicensed mobile device 118 may be outside of the licensed service area 102 in some situations. Since the unlicensed frequency band is monitored for energy prior to transmission by the UE device 108, interference at the unlicensed devices is reduced. In addition, interference at the licensed devices due to transmission by the unlicensed devices is also reduced.

In one example, eNBs provide unlicensed resource information to other nearby eNBs where the unlicensed resource information identifies the unlicensed communication resources that are being, or will be, used for communication in the unlicensed frequency band. The eNBs receiving the resource information identify unused unlicensed resources based on the resource information and use unlicensed communication resources least likely to cause interference.

In other examples, as discussed in further detail below, on observation procedure is performed by one or more eNBs and/or one or more UE devices. Frequency band measurements are taken by one or more eNBs and/or one or more UE devices to determine if it is likely that the unlicensed frequency band is in used by other equipment sufficiently close to result in interference. The unlicensed frequency band is observed for a relatively long period of time as compared to conventional sensing techniques used prior to a transmission in the unlicensed frequency band. For example, the unlicensed frequency band may be monitored on the order of hours. The energy within the unlicensed frequency band is measured and compared to a threshold. If the energy level is below a threshold (e.g., no interference is detected), it is determined that no nearby equipment is using the unlicensed frequency band and the licensed equipment operates in a non-sensing mode where the sensing/monitoring of unlicensed frequency band before transmission is omitted or at least reduced. The non-sensing mode differs from a sensing mode where devices sense or monitor one or more channels before transmitting a signal in the unlicensed frequency band. The sensing mode, therefore, is employed when it is confirmed that other nearby devices are using the unlicensed frequency band for communication or when it cannot be determined that no devices are using the unlicensed frequency band.

For the examples herein, the frequency band measurements of the observation procedure also differ from conventional listen-before-talk sensing techniques in that the interference measurements are based on the entire, or nearly entire, unlicensed frequency band. Conventional sensing techniques sense particular channels within the unlicensed frequency band to detect potential signals. In contrast, for the examples herein, the unlicensed frequency band is observed to detect any energy anywhere in the band that may indicate the band is in use.

The eNB may execute the observation procedure by making the frequency band measurements and/or may instruct one or more UE devices to perform the observation procedure by taking frequency band measurements and reporting the results to the eNB. For the example discussed with reference to FIG. 9, for example, the eNB observes the unlicensed frequency band for the observation period and if the energy level does not exceed a threshold during the observation period, instructs at least one UE device to perform the observation procedure. The UE device reports the results and, if the UE did not detect energy above a threshold, the eNB instructs the UE devices that it is serving to operate in a non-sensing mode.

Figure 2:
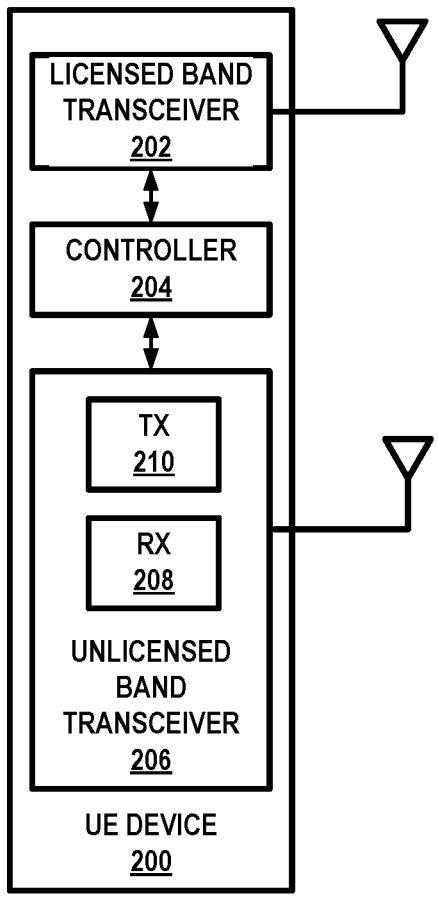
FIG. 2 is a block diagram of an example of a UE device suitable for use as one of the UE devices in FIG. 1.

FIG. 2 is a block diagram of an example of a UE device 200 suitable for use as one of the UE devices 106, 108, 110 in FIG. 1. The UE device 200 includes a licensed band transceiver 202, a controller 204, as well as other components and circuitry (not shown) such as memory, for example. For the examples herein, each UE device also includes an unlicensed band transceiver 206 which includes an unlicensed band receiver 208 and an unlicensed band transmitter 210. The unlicensed band transmitter 210 transmits signals over the unlicensed frequency band where, depending on the situation, the signals may provide uplink control information to the eNB, uplink data information to the eNB, D2D control information to another UE, and/or D2D data information to another UE device. The unlicensed band transmitter 210 may also be used in some situations to transmit a reserve signal in the unlicensed frequency band as discussed below in further detail. The unlicensed band transmitter 210 may be omitted from the UE device 200. This may be the case where the UE device 200 is used to only monitor the unlicensed band and/or only to receive signals within the unlicensed band. The unlicensed band receiver 208 receives signals over the unlicensed frequency band where, depending on the situation, the signals may provide downlink control information from the eNB, downlink data information from the eNB, D2D control information from another UE, and/or D2D data information from another UE device.

The licensed band transceiver 202 includes a transmitter that transmits uplink wireless signals to eNBs and a receiver that receives downlink wireless signals from the eNBs within the licensed frequency band. The transceiver can also be configured to transmit and receive D2D signals using allocated licensed uplink communication resources. The controller 204 controls components of the UE device 200 to manage the functions of the device 200 described herein as well as to facilitate the overall functionality of the device 200. The controller 204 is connected to the transceivers 202, 208 and other components such as memory.

The unlicensed band receiver 208 may be used to sense/monitor the unlicensed frequency band before a transmission in the unlicensed frequency band when the UE device is operating in the sensing mode. In addition, the unlicensed band receiver 208 may be used to perform the observation procedure. For the examples, the controller and the unlicensed band receiver 208 measure one or parameters that indicate the energy level within the unlicensed frequency band. An example of a suitable technique includes determining the received signal strength indicator (RSSI) which is a measurement of the power present in the received radio signal. The RSSI is compared to a threshold.

As discussed below, the unlicensed band receiver 208 is also used to measure channel conditions of the unlicensed frequency band during the non-sensing mode. Using techniques at least similar (if not the same) as the techniques used in the licensed frequency band for radio resource management (RRM) measurements.

Figure 3:
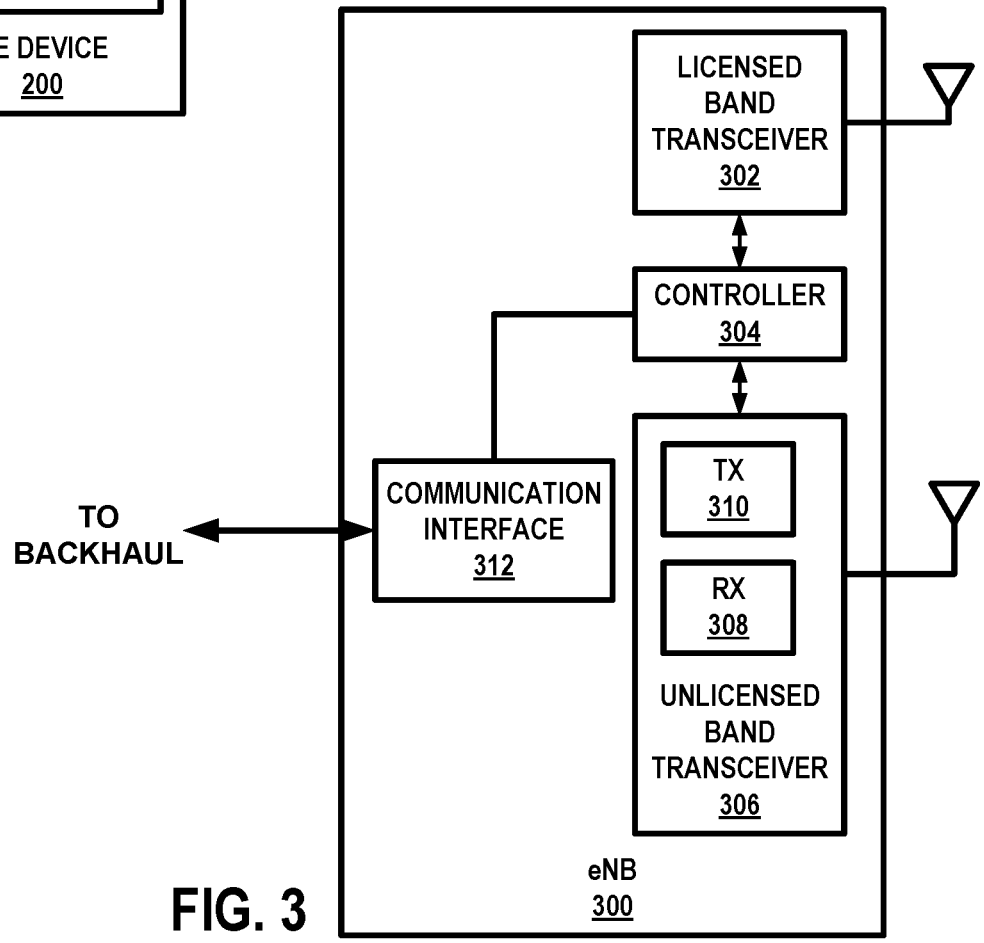
FIG. 3 is a block diagram of an example of an enhanced Node B (eNB) suitable for use as the eNB in FIG. 1.

FIG. 3 is a block diagram of an example of an eNB 300 suitable for use as the eNB 104 in FIG. 1. The eNB 300 includes a licensed band transceiver 302, a controller 304, as well as other components and circuitry (not shown) such as memory, for example. For the examples herein, the eNB also includes an unlicensed band transceiver 306 which includes an unlicensed band receiver 308 and an unlicensed band transmitter 310. The unlicensed band transmitter 310 transmits signals over the unlicensed frequency band where, depending on the situation, the signals may provide downlink control information to the UE device and downlink data information to the UE device. The unlicensed band transmitter 310 may also be used in some situations to transmit a reserve signal in the unlicensed frequency band as discussed below in further detail. The unlicensed band transmitter 310 may be omitted from the eNB 300. This may be the case where the eNB is used to only monitor the unlicensed band and/or only to receive signals within the unlicensed band. The licensed band transceiver 302 exchanges wireless signals with the UE devices 104, 106, 108, 110 within the service area 102. Transmissions within the licensed band from the eNB and from the UE devices are governed by a communication specification that defines signaling, protocols, and parameters of the transmission with the frequency band licensed to the operator of the licensed system 100. The communication specification may provide strict rules for communication and may also provide general requirements where specific implementations may vary while still adhering to the communication specification. Although the discussion herein is directed to the 3GPP Long Term Evolution (LTE) communication specification, other communication specifications may be used in some circumstances. The communication specification defines at least a data channel and a control channel for uplink and downlink transmissions and specifies at least some timing and frequency parameters for physical channels. As discussed below in further detail, at least one of the timing parameters is applied to the unlicensed frequency band.

The licensed band transceiver 302, therefore, includes at least a downlink transmitter for transmitting downlink signals and an uplink receiver for receiving uplink signals. In some situations, the licensed band transceiver also includes downlink receiver. As discussed below, eNBs may wirelessly transmit unlicensed frequency band communication resource information in a downlink broadcast message for receipt by other nearby eNBs. Accordingly, the downlink receiver in the eNB 300 receives downlink signals from other eNBs.

The unlicensed band receiver 308 may be used to sense/monitor the unlicensed frequency band before a transmission in the unlicensed frequency band when the eNB is operating in the sensing mode. In addition, the unlicensed band receiver 308 may be used to perform the observation procedure. For the examples, the controller and the unlicensed band receiver 308 measure one or parameters that indicate the energy level within the unlicensed frequency band. An example of a suitable technique includes determining the received signal strength indicator (RSSI) which is a measurement of the power present in the received radio signal. The RSSI is compared to a threshold. The threshold used by the eNB is typically the same as the threshold used by UE devices although in some circumstances the thresholds may be different.

For the example, the eNB 300 also includes a communication interface 312 for facilitating communication over the backhaul with other eNBs and network entities. Where X2 signaling is available, the communication interface 312 communicates over the backhaul using X2.

Figure 4:
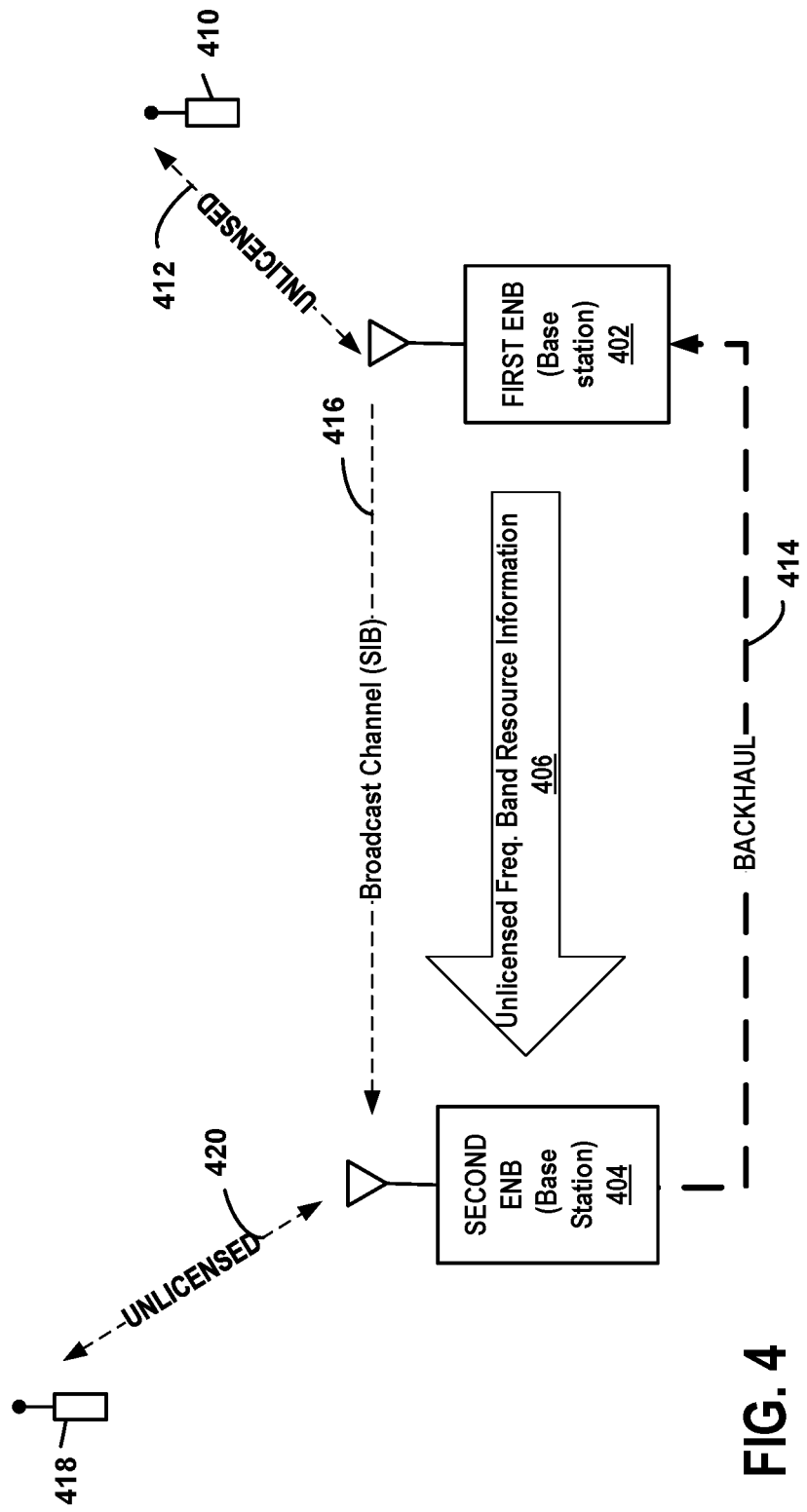
FIG. 4 is a block diagram of a first eNB and a second eNB of the licensed communication system for an example where unlicensed frequency band resource information is provided by the first eNB to the second eNB.

FIG. 4 is a block diagram of a first eNB 402 and a second eNB 404 of the licensed communication system 100 for an example where unlicensed frequency band resource information 406 is provided by the first eNB 402 to the second eNB 404. The eNBs 402, 404 are eNBs are examples of the eNBs 104, 300 discussed above and provide wireless service within the licensed frequency band in accordance with communication specification such as LTE. For the example, the first eNB 402 communicates with one or more UE devices 410 over a wireless channel 412 in the unlicensed frequency band. Accordingly, the first eNB 402 uses unlicensed communication resources in the unlicensed frequency band. For the example, the first eNB 402 provides unlicensed frequency band resource information 406 to other nearby eNBs such as the second eNB 404. The unlicensed frequency band resource information 406 is indicative of the unlicensed frequency band communication resources that are being used to communicate with the one or more UE devices 410 and/or that will be used to communicate with the one or more UE devices 410. The unlicensed frequency band communication resource information 406 in the examples herein is a message or signal that specifies the time-frequency resources that are to be used by the eNB 402 for communication in the unlicensed frequency band. The specified time-frequency resources may be used for downlink communication and/or uplink communication.

In some situations, the first eNB 402 is connected to the second eNB through a backhaul 414. The backhaul can utilize any combination of wired and wireless communication links to establish communication between the eNBs. The backhaul 414, for example, may include radio frequency and point-to-point microwave links and transmission hardware such as transmitters, receivers, wires, coaxial cables, fiber optic cables, and other known devices and equipment. In some circumstance, the backhaul supports X2 signaling and/or packet data protocols such as those used with the Internet. Where a backhaul is available, the first eNB transmits the unlicensed frequency band resource information over the backhaul 414 by applying techniques in accordance with conventional signaling over a backhaul. An X2 message, for example, can be sent including the unlicensed frequency band communication resource information.

In situations where the eNBs are not connected through a backhaul, the first eNB 402 provides unlicensed frequency band communication resource information 406 to nearby eNBs (404) by broadcasting the unlicensed frequency band communication resource information over a wireless channel 416. An example of a suitable technique of broadcasting the information 406 in an LTE system includes transmitting a System Information Blocks (SIB) message including the information 406. Since SIBs are transmitted in the downlink channel, the nearby eNBs 404 receive the SIB signals using a downlink receiver.

In another example, the first eNB 402 broadcasts the unlicensed frequency band communication resource information in the uplink channel. An example of suitable technique for broadcasting the unlicensed frequency band communication resource information on the uplink channel includes using a D2D channel defined by some revisions of the LTE standard. For example a broadcasts message similar to a D2D discovery signal can be sent from the eNB 402.

After receiving the unlicensed frequency band communication resource information 406, the second eNB 404 identifies which communication resources within the unlicensed frequency band are not in use. These unused unlicensed frequency band resources can then be used by the second eNB 404 to communicate with one or more UE devices 418 over a wireless channel 420 in the unlicensed frequency band. Generally, the unlicensed frequency band resources identified in the unlicensed frequency band communication resource information are not used by the eNB 404. Therefore, the first eNB 402 reserves unlicensed frequency band resources for communication minimizing interference in the unlicensed frequency band. In some situations, the second eNB 404 may respond to the first eNB 402 with an indication that identified resources should not be used by the first eNB 402. Such a situation may occur where the second eNB 402 requires the resources for high priority communication such as E911. Although not shown in FIG. 4, the second eNB 404 transmits its own unlicensed frequency band communication resource information to nearby eNBs (such as the first eNB 402). In some situations there are more than two eNBs within proximity of each other and each eNB received multiple unlicensed frequency band communication resource information messages from multiple eNBs.

Figure 5:
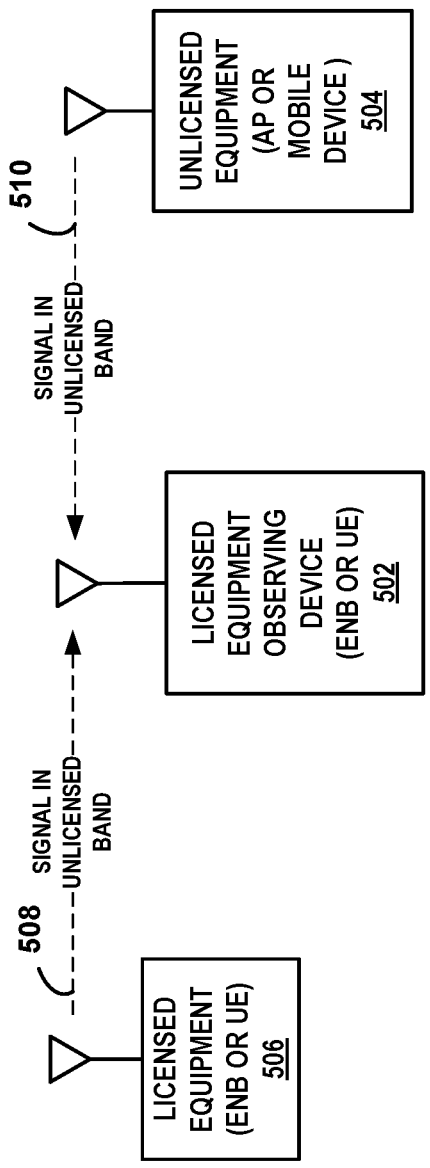
FIG. 5 is a block diagram of licensed equipment performing an observation procedure by obtaining frequency band measurements of the unlicensed frequency band.

FIG. 5 is a block diagram of licensed equipment 502 performing an observation procedure of the unlicensed frequency band. The licensed equipment observing device is any device that operates in the licensed band. For the example of FIG. 5, the licensed equipment observing device 502 can be either an eNB or a UE device where more specific examples of each are discussed below. The licensed equipment observing device 502 monitors the unlicensed frequency band for radio energy that may be caused by unlicensed equipment 504 or licensed equipment 506 using the unlicensed frequency band. Signals 508 transmitted by an eNB or UE device and signal 510 transmitted by access points (APs) and mobile devices are received by the licensed equipment observing device 502 and evaluated. The received RF energy level is periodically measured during the observation time and compared to a threshold. If during the observation time, the energy level exceeds the threshold, the licensed equipment observing device 502 determines that other equipment within the service area is using the unlicensed spectrum. Otherwise, it is determined that the unlicensed frequency band is not in use.

Although various measurement timings and techniques can be used, the timing should be selected such that the likelihood that a device is using the unlicensed frequency band but is not detected is minimized. For example, the time period between measurements should not have a length such that a device could transmit between measurements and not be detected. The time period between measurements can be dynamic and, in some situations, be varied depending on current circumstances. Unlike for the case of RSRP/RSRQ measurements for LTE in licensed bands, there are no specific reference signals that the device is measuring in predefined subframe locations. The eNB should specify the periodicity and time period of each RSSI measurement. The eNB may determine the current periodicity and time period of the RSSI measurements using observed traffic patterns from e.g., APs in the unlicensed band. Alternatively, the eNB may configure measurement gaps to the device to allow the UE device to perform RSSI measurements based on these measurement gaps. The UE device may also perform RSSI measurements using Autonomous Gaps. If autonomous gaps are used to perform measurements, the UE is allowed to temporarily abort communication with all serving cell(s), i.e., create autonomous gaps to perform the corresponding measurements within the limits specified in TS 36.133 [16]. In yet another mode of operation, the UE device with multiple receivers may continuously measure the RSSI signal for the entire duration of the measurement request from the eNB (e.g., 1 hour) in the specified frequency/band without any impact to its cellular reception. The UE may determine such measurement based on its reserved battery power remaining. Other signal measurements can also be used. Examples of other forms of measurements include BeaconRSSI, RCPI (Received channel power indicator) and RSNI (Received Signal to Noise Indicator) that are specific to WLAN in case the eNB is already aware of the type of interference expected in the region.

Figure 6:
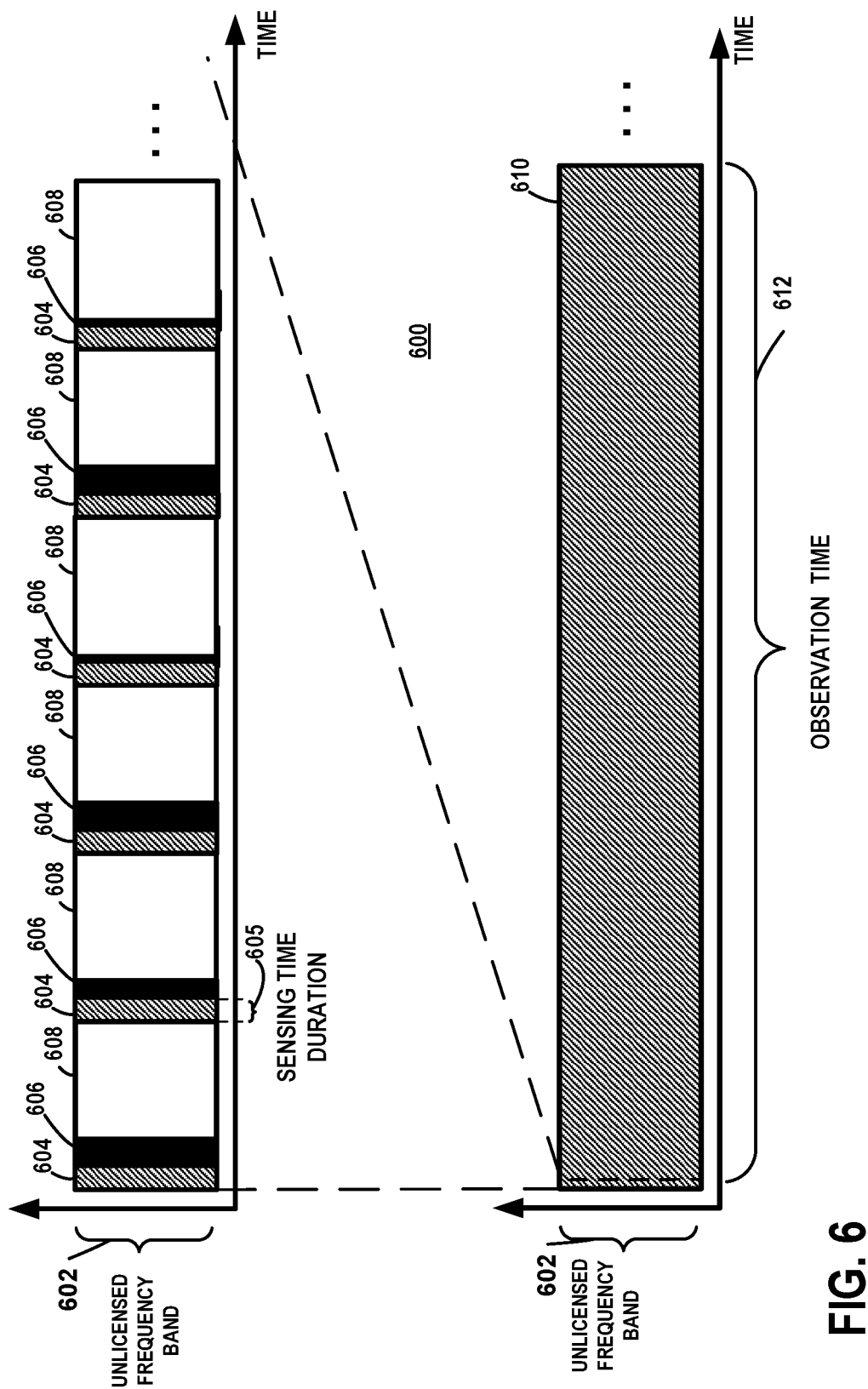
FIG. 6 is an illustration of a timing relationship of the unlicensed frequency of an observing procedure as compared to a sensing/back-off procedure.

FIG. 6 is an illustration of a timing relationship 600 of the unlicensed frequency 602 of the observing procedure as compared to a sensing/back-off procedure. Typically, equipment operating in an unlicensed frequency band, such as an 802.11 band, must adhere to regulations and/or communication standards. These regulation or standards often utilize carrier sense multiple access (CSMA) where a transmitting device is required to "listen before talk". Unlicensed systems may also employ collision avoidance techniques. In some circumstances, licensed equipment operating in the unlicensed frequency band may also employ the channel access techniques required in the unlicensed frequency band.

For the example, channel access procedure used in the unlicensed frequency band is a sense and back-off procedure (sense/back-off procedure) where the unlicensed frequency band is monitored 604 for a sensing time duration 605 and, if no other devices are determined to be using the band, the eNB waits a back-off period 606 before transmitting. The back-off period 606 is dynamic and may be determined by a formula typically applied by unlicensed equipment in the unlicensed band. The sensing time duration 605 is typically on the order of tens of microseconds.

The licensed equipment observing device 502 performs an observation procedure 610 for an observation time duration 612. As discussed above, the licensed equipment 502 continually (or periodically at a sufficient frequency) compares received signal energy in the unlicensed frequency band to a threshold. If the threshold is exceeded, it is determined that other equipment using the unlicensed frequency band is sufficiently close to create interference. As illustrated in FIG. 6, the observing time duration 612 is relatively long and is significantly longer than the sending time duration 605. The time duration 605 is selected such that it is sufficiently long to allow reliable determination that no other equipment is using the unlicensed frequency band. The observation time duration 605 is typically on the order of hours and may be several days. An example of a suitable observing time duration 605 is 12 hours. Other time durations can be used and may depend on the factors such as the expected radio traffic in the area, history of radio traffic in the area, and other factors. In some circumstances, the time duration 605 may be less than an hour.

Figure 7:
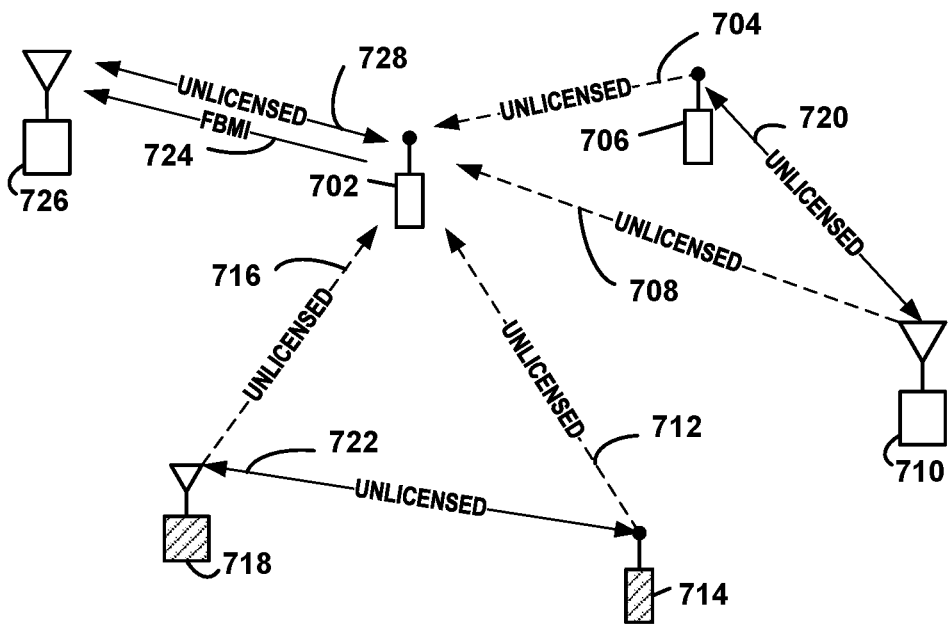
FIG. 7 is an illustration of unlicensed equipment and licensed equipment for an example where the licensed equipment observing device is a UE device.

FIG. 7 is an illustration of unlicensed equipment and licensed equipment for an example where the licensed equipment observing device 502 is a UE device 702. The observing UE device 702 monitors the unlicensed frequency band for energy from signals transmitted within the unlicensed frequency band where the signals may include signals 704 transmitted by another UE device 706, signals 708 transmitted by an eNB 710, signals 712 transmitted by a mobile device 714, and signals 716 transmitted by an access point (AP) 718. The signals 704, 708 result from communication 720 in the unlicensed frequency band between the eNB 710 and the UE device 706. Therefore, the signal energy at the UE device 702 may be due to licensed equipment operating in the unlicensed frequency band. The signals 712, 716 result from communication 722 in the unlicensed frequency band between the access point 718 and the mobile device 714. The signal energy, therefore, at the UE device 702 may result from one more unlicensed devices operating in the unlicensed frequency band.

The UE device 702 observes the unlicensed frequency band by taking frequency band measurements and, if the detected energy is below the threshold for a sufficiently long time, determines that the unlicensed frequency band is not being used by any nearby equipment. For the examples herein, the UE device 702 reports the results in frequency band measurement information 724 to its serving eNB 726. The eNB 726, at least partially based on the frequency band measurement information 724, determines whether communications 728 in the unlicensed frequency band should be modified. For example, the eNB 726 may determine that the eNB and UE device can operate in a non-sensing mode where the equipment does not employ a sense/back-off procedure before transmitting in the unlicensed frequency band. An example of suitable technique includes operating in the unlicensed frequency band with the same channel access protocol used in the licensed frequency band. The eNB 726 and the UE device 702, therefore, operate in sensing mode when the unlicensed frequency band is being used by other nearby equipment and operate in a non-sensing mode when it is determined that the unlicensed frequency band is not being used by other equipment.

The frequency band measurement information 724 is indicative of the frequency band measurements taken by the UE device. In some situations, frequency band measurement information 724 is indicative of a comparison of one or more measured energy levels to the threshold. For example, the frequency band measurement information 724 may simply be a flag indicating that the energy level has exceeded the threshold within the observation time period. In other situations, the frequency band measurement information 724 may be measurements, values, or data based on measurement values which can be used by the eNB to make determinations regarding the use of the unlicensed frequency band by other devices.

Figure 8:
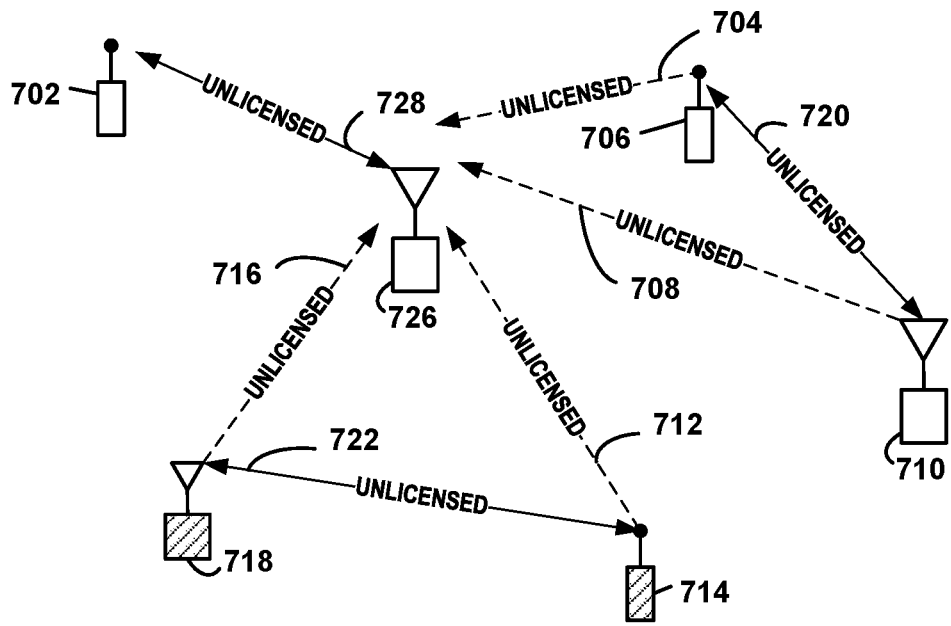
FIG. 8 is an illustration of unlicensed equipment and licensed equipment for an example where the licensed equipment observing device is an eNB.

FIG. 8 is an illustration of unlicensed equipment and licensed equipment for an example where the licensed equipment observing device 502 is an eNB 726. The eNB 726 monitors the unlicensed frequency band for energy from signals transmitted within the unlicensed frequency band where the signals may include signals 704 transmitted by another UE device 706, signals 708 transmitted by an eNB 710, signals 712 transmitted by a mobile device 714, and signals 716 transmitted by an access point (AP) 718. The signals 704, 708 result from communication 720 in the unlicensed frequency band between the eNB 710 and the UE device 706. Therefore, the signal energy at the eNB 726 may be due to licensed equipment operating in the unlicensed frequency band. The signals 712, 716 result from communication 722 in the unlicensed frequency band between the access point 718 and the mobile device 714. The signal energy, therefore, at the eNB 726 may result from one or more unlicensed devices operating in the unlicensed frequency band.

The eNB 726 monitors the unlicensed frequency band and, if the detected energy is below the threshold for a sufficiently long time, determines that the unlicensed frequency band is not being used by any nearby equipment. The eNB 726, at least partially based on the measurements of the unlicensed frequency band, determines whether communications in the unlicensed frequency band should be modified. For example, the eNB 726 may determine that the eNB and UE device can operate in the non-sensing mode where the equipment does not employ a sense/back-off procedure before transmitting in the unlicensed frequency band.

In many circumstances, the eNB 726 bases the determination on multiple interference measurement reports receives from multiple UE devices as well as on its own measurements of the unlicensed frequency band. The eNB 726 may approach the use of the non-sensing mode more conservatively. In case any UE device reports a measurement above the threshold the eNB 726 should not apply the non-sensing mode. Another technique includes having coordination among eNBs whereby the first eNB 402 informs the second eNB 404 in case eNB 402 detects interference in the unlicensed band but the second eNB 404 does not. This technique assumes that the two eNBs are in close proximity.

The eNB 726 and the UE device 702 continue to monitor the unlicensed frequency band when in the non-sensing mode. In one example, UE devices operating in the non-sensing mode perform Radio Resource Management (RRM) measurements of the unlicensed frequency band and report the RRM measurements to the eNB 726. The eNB 726 configures one or more thresholds in the UE devices either by broadcast (SIB) or dedicated controls signals. The thresholds may include one or more of a radio signal strength indicator (RSSI), a received channel power indicator (RCPI), a received signal to noise indicator (RSNI), and an average noise plus interference (ANPI) indicator. The eNB compares the reported RRM measurements to thresholds and makes an assessment of the channel characteristics. In some situations, the channel characteristics may indicate a potential interferer which triggers the eNB to return to sensing mode, perform the frequency band observation procedure, and/or instruct one or more UE devices to perform the frequency band observation procedure.

Figure 9:
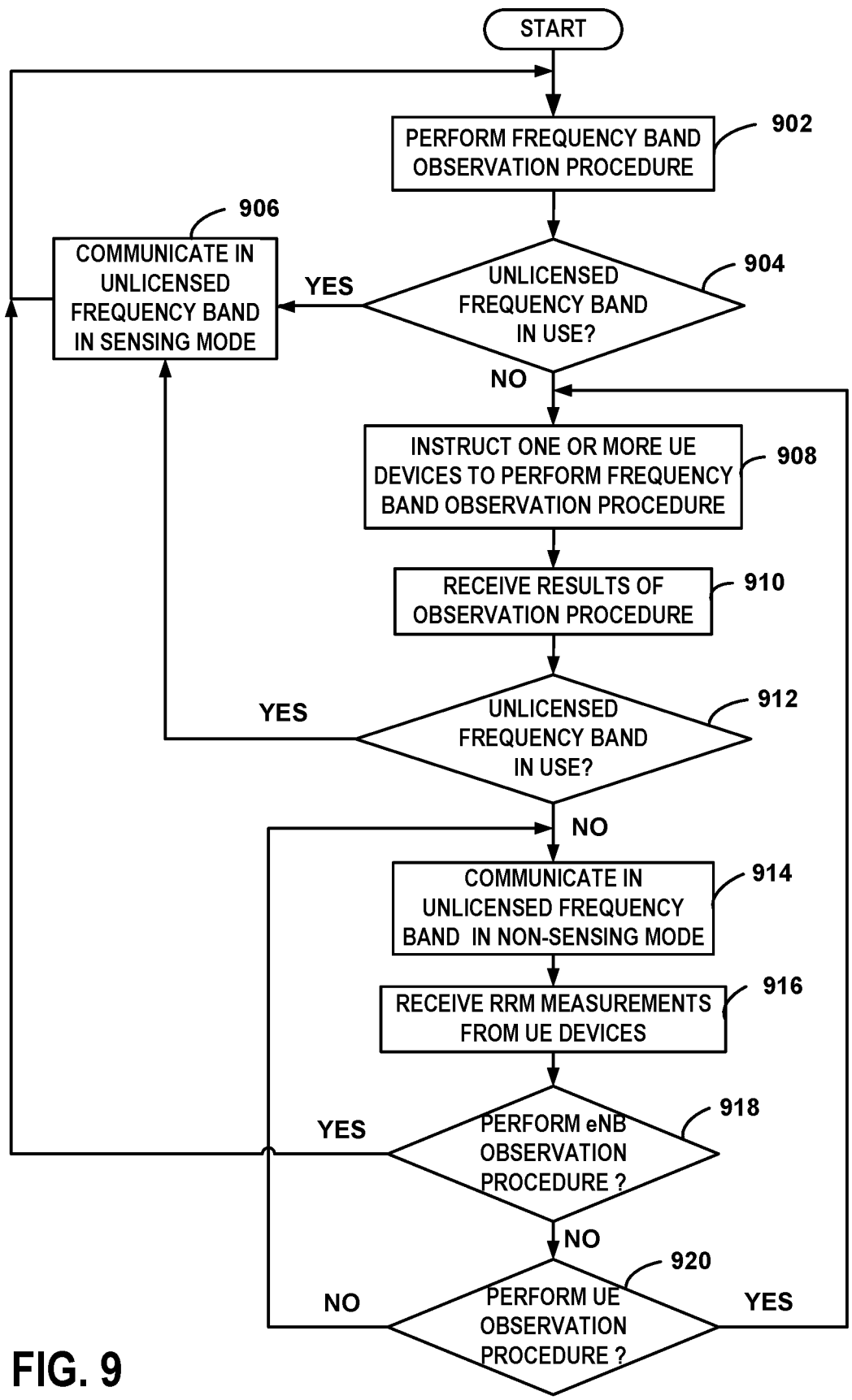
FIG. 9 is a flow chart of a method performed at an eNB for an example of managing operation of a licensed communication system in an unlicensed frequency band in a sensing mode and a non-sensing mode.

FIG. 9 is a flow chart of a method performed at an eNB for an example of managing operation of a licensed communication system in an unlicensed frequency band in a sensing mode and a non-sensing mode.

At step 902, the eNB performs a frequency band observation procedure on the unlicensed frequency band. The eNB periodically measures the energy level within the unlicensed frequency band for the observation time. As discussed above, an example of a suitable technique of observing the band includes measuring RSSI over for the entire band and comparing the level to a threshold.

At step 904, if the energy level exceeds a threshold, the eNB determines that other devices are transmitting within the unlicensed frequency band. If other devices are using the unlicensed frequency band, the method continues at step 906. Otherwise, the method continues at step 908.

At step 906, the system communicates in the unlicensed frequency band 906 in the sensing mode. Since other devices are using the unlicensed frequency band, the licensed equipment (eNB and UE devices) must sense the band before transmitting. The method returns to step 902 to perform the observation procedure. Although the eNB can immediately begin the procedure, it some circumstances the eNB can delay before beginning the procedure. The eNB could, for example, wait at least an hour before performing step 902. Delaying is not critical for the eNB since the eNB is not power constrained. Therefore, even continuous measurement is not a significant consideration for the eNB in most circumstances. The length of the delay may be based on a fixed time or may be based on other factors. For example, when measured channel quality is above a threshold, the eNB may perform the observation procedure.

At step 908, the eNB instructs one or more UE devices to perform a frequency band observation procedure. Although the eNB has not detected significant energy in the unlicensed frequency band, it is possible that other devices are operating in the unlicensed frequency band. Such a situation is often referred to as the "hidden node". The UE devices are more likely to detect the energy of these other devices in these cases. In some situations, the UE devices and the eNB may perform their observation procedures simultaneously or at least have overlapping observation times. In most situations, in order to avoid unnecessary power consumption by the UE devices, the eNB does not instruct the UE devices to perform the observation procedure until a relatively high confidence level that no other devices are present is achieved.

At step 910, the eNB receives, from the one or more UE devices, the results of the observation procedures performed by the UE devices. For the example, the UE devices transmit frequency band measurement information indicative of the observation procedure measurements. The information includes measurements or information based on measurements. For example, the results may include information regarding whether the UE device has determined whether or not other devices are using the unlicensed frequency band. When performing the observation procedure for the examples herein, each UE device periodically measures the RSSI over an observation period, compares the RSSI levels to a threshold, and reports to the eNB the results. The observation times and the thresholds of the UE devices and the eNB may be the same or may be different, depending on the particular implementation. The UE devices, however may report the measurements or other information in some situations.

A step 912, the eNB determines whether the unlicensed frequency band is in use by other devices. The eNB makes the determination at least partially based on the results received from one or more of the UE devices. Where the results indicate that an UE device has determined that the energy level has exceeded the threshold and other devices are using the unlicensed frequency band, the eNB determines that the band is in use. Where measurements or other less definitive information is provided by the UE devices, the eNB processes the information to determine whether the unlicensed frequency band is in use by other devices. The eNB may process the information from each UE device individually or may process the information from multiple UE devices collectively. In some situations, the eNB may include measurements taken at the eNB when evaluating the results provided by the UE devices and determining whether the unlicensed frequency band is in use by other devices. If it is determined that the unlicensed frequency band is in use by other devices, the method returns to step 906. Otherwise, the method continues at step 914.

At step 914, the system operates in the unlicensed frequency band in the non-sensing mode. The eNB instructs the UE devices to operate in the non-sensing mode starting at a particular frame, subframe, or time. The eNB and the UE devices do not sense the unlicensed frequency band before transmissions as dictated by the rules or standards governing the unlicensed frequency band. Rather, the licensed equipment operates similarly to the operation in the licensed frequency band. For example, the techniques used in an LTE system operating in accordance with one or more revision of the 3GPP LTE standard are used to communicate in the unlicensed frequency band (at the different frequencies).

At step 916, the eNB receives RRM measurements from the UE devices. For the examples, the eNB receives the RRM measurement while the system is communicating in the non-sensing mode (step 914). For the example, the RRM measurements are the same RRM measurements taken and reported by the UE devices when operating in the licensed frequency band except that the measurements are taken at the different frequencies of the unlicensed frequency band.

At step 918, the eNB determines whether the frequency band observation procedure should be performed by the eNB. The determination may be based on several factors or combination of factors including, but not limited to, RRM measurements, channel characteristics, elapsed time since the eNB has performed the observation procedure, and the elapsed time since an eNB as performed an observation procedure. If it is determined that the observation procedure should be performed, the method returns to step 902. Otherwise, the method continues at step 920. As discussed above, the observation procedure may be performed by the UE device and the eNB at the same time in some circumstances. Where the decision to perform the observation procedure is based on RRM measurements from the UE devices, the eNB may determine that the UE device should perform the observation procedure at step 902.

At step 920, the eNB determines whether the frequency band observation procedure should be performed at one or more UE devices. The determination may be based on several factors or combination of factors including, but not limited to, RRM measurements, channel characteristics, elapsed time since the eNB has performed the observation procedure, and the elapsed time since an eNB as performed an observation procedure. If it is determined that the observation procedure should be performed, the method returns to step 908. Otherwise, the method returns to step 914. As discussed above, the observation procedure may be performed by the UE device and the eNB and the same time in some circumstances. The eNB may determine that the eNB should also perform the observation procedure at step 908.

Figure 10:
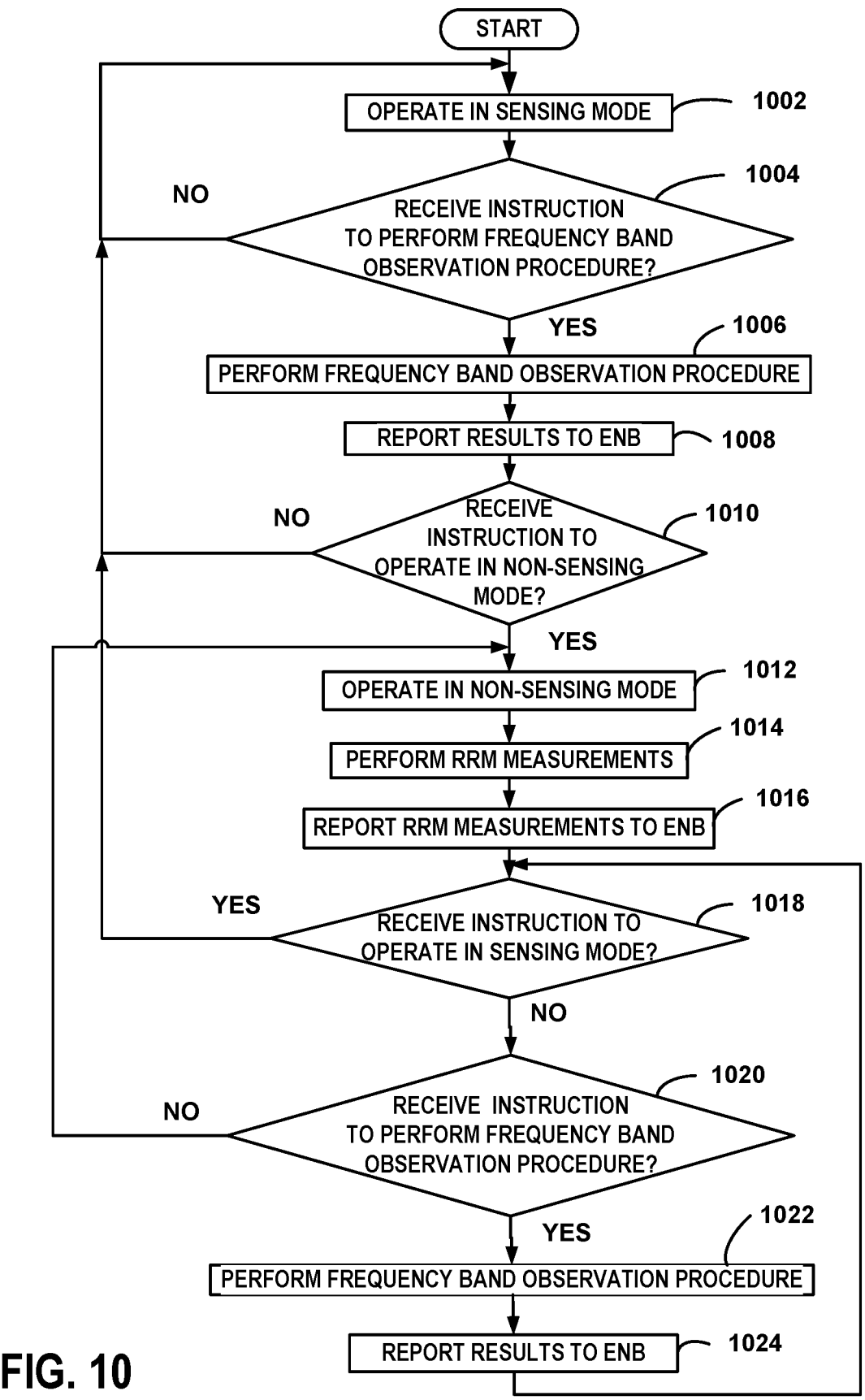
FIG. 10 is a flow chart of a method performed at a UE device for an example of managing operation of a licensed communication system in an unlicensed frequency band in a sensing mode and a non-sensing mode.

FIG. 10 is a flow chart of a method performed at a UE device for an example of managing operation of a licensed communication system in an unlicensed frequency band in a sensing mode and a non-sensing mode.

At step 1002, the UE device operates in the sensing mode in the unlicensed frequency band. Accordingly, the UE device monitored the unlicensed frequency band before transmission in the unlicensed frequency band.

At step 1004, the UE device determines if an instruction has been received from the eNB to perform frequency band observation procedure. If an instruction has been received, the method continues at step 1006. Otherwise, the method returns to step 1002.

A step 1006, the UE device performs the frequency band observation procedure. As discussed above, the UE device measures the energy in the unlicensed frequency band for an observation time. The UE device may measure RSSI for the band, for example.

At step 1008, the UE device reports the results of the observation procedure. For the example, the results include a determination of whether the RSSI level exceeded a threshold. In some circumstances, however, results of the observation procedure may include the RSSI measurements and/or other information.

At step 1010, the UE device determines if an instruction to operate in the non-sensing mode has been received. If the eNB instructs the UE device to operate in the non-sensing mode, the UE device continues at step 1012 where the device operates in the non-sending mode. Otherwise, the method returns to step 1002.

At step 1014 and 1016, the UE device performs and reports RRM measurements to the eNB while operating in the sensing mode. As discussed above, the RRM measurement procedure is similar to the procedure followed in the licensed frequency band.

At step 1018, the UE device determines whether an instruction has been received to operate in the sensing mode. If an instruction has been received, the method returns to step 1002. Otherwise, the method continues at step 1020.

At step 1020, the eNB determines whether an instruction has been received to perform the observation procedure. If an instruction has been received, the method proceeds to step 1022. Otherwise, the method returns to step 1012.

At step 1022, the UE performs the observation procedure and reports the results at step 1024. In some situations, the eNB instructs the UE device to operate in the sensing mode when performing the observation procedure, and in other situations, the UE device continues operating in the non-sensing mode, reporting RRM measurements and performing the observation procedure.

Clearly, other embodiments and modifications of this invention will occur readily to those of ordinary skill in the art in view of these teachings. The above description is illustrative and not restrictive. This invention is to be limited only by the following claims, which include all such embodiments and modifications when viewed in conjunction with the above specification and accompanying drawings. The scope of the invention should, therefore, be determined not with reference to the above description, but instead should be determined with reference to the appended claims along with their full scope of equivalents.

What is claimed is:

1. A method comprising:
receiving, from a base station at a user equipment (UE), first information designating a first monitoring mode as a designated monitoring mode of determining whether the UE transmits a first signal in an unlicensed frequency band,
in response to receiving the first information, executing the first monitoring mode to perform first monitoring of the unlicensed frequency band to determine whether the unlicensed frequency band is in use,
in response to determining from the first monitoring that the unlicensed frequency band is not in use, transmitting the first signal to the base station in the unlicensed frequency band,
receiving, from the base station at the UE, second information designating a second monitoring mode as the designated monitoring mode of determining whether the UE transmits a second signal in the unlicensed frequency band,
in response to receiving the second information and before transmitting any signal in the unlicensed frequency band, executing the second monitoring mode to perform second monitoring of the unlicensed frequency band to determine whether the unlicensed frequency band is in use, the second monitoring of the unlicensed frequency band comprising reduced sensing of the unlicensed frequency band as compared to the first monitoring, the second monitoring performed without transmitting any signal in the unlicensed frequency band, the first monitoring and the second monitoring measuring the same characteristics of the unlicensed frequency band, and
in response to determining from the second monitoring that the unlicensed frequency band is not in use, transmitting the second signal to the base station in the unlicensed frequency band.

2. The method of claim 1, wherein the first monitoring and the second monitoring measure the characteristic in accordance with the same radio access technology.

3. A user equipment (UE) comprising:
a transceiver configured to:
receive, from a base station, first information designating a first monitoring mode as a designated monitoring mode of determining whether the UE transmits a first signal in an unlicensed frequency band,
in response to receipt of the first information, execute the first monitoring mode to perform first monitoring of the unlicensed frequency band to determine whether the unlicensed frequency band is in use,
in response to a determination from the first monitoring that the unlicensed frequency band is not in use, transmitting the first signal to the base station in the unlicensed frequency band,
receive, from the base station, second information designating a second monitoring mode as the designated monitoring mode of determining whether the UE transmits a second signal in the unlicensed frequency band,
in response to receipt of the second information and before transmission by the UE of any signal in the unlicensed frequency band, execute the second monitoring mode to perform second monitoring of the unlicensed frequency band to determine whether the unlicensed frequency band is in use, the second monitoring performed without transmitting any signal in the unlicensed frequency band, the second monitoring of the unlicensed frequency band comprising reduced sensing of the unlicensed frequency band as compared to the first monitoring, the first monitoring and the second monitoring measuring the same characteristics of the unlicensed frequency band; and
in response to a determination from the second monitoring that the unlicensed frequency band is not in use, transmit the second signal to the base station in the unlicensed frequency band.

4. The UE of claim 3, wherein the first monitoring and the second monitoring measure the characteristic in accordance with the same radio access technology.

5. A base station comprising:
a transceiver configured to:
transmit, to a user equipment (UE), first information designating a first monitoring mode as a designated monitoring mode of determining whether the UE transmits a first signal in the unlicensed frequency band,
receive, from the UE, the first signal within the unlicensed frequency band, the first signal transmitted by the UE by at least executing the first monitoring mode before transmitting the first signal,
transmit, to the UE, second information designating a second mode as the mode of determining whether the UE transmits a second signal in the unlicensed frequency band,
receive, from the UE, the second signal within the unlicensed frequency band, the second signal transmitted by the UE by at least executing the second monitoring mode before transmitting the second signal, wherein:
the first monitoring mode comprises the UE monitoring the unlicensed frequency band to check whether the unlicensed frequency band is in use, and
the second monitoring mode comprises the UE monitoring of the unlicensed frequency band without transmitting any signal in the unlicensed band, with reduced sensing of the unlicensed frequency band as compared to the first monitoring, to check whether the unlicensed frequency band is in use, the first monitoring mode and the second monitoring mode comprising a measurement of the same characteristics of the unlicensed frequency band.

6. The base station of claim 5, wherein the first monitoring mode and the second monitoring mode measure the characteristic in accordance with the same radio access technology.

7. An apparatus for controlling a user equipment (UE), the apparatus comprising:
a memory; and
a controller, configured to cause the UE to:

receive, from the base station, first information designating a first monitoring mode as a designated monitoring mode of determining whether the UE transmits a first signal in the unlicensed frequency band, in response to receipt of the first information, execute the first monitoring mode to perform to determine whether the unlicensed frequency band is in use, in response to a determination from the first monitoring mode that the unlicensed frequency band is not in use, transmit the first signal to the base station in the unlicensed frequency band, receive, from the base station, second information designating a second monitoring mode as the designated monitoring mode of determining whether the UE transmits a second signal in the unlicensed frequency band, in response to receipt of the second information and before transmission by the UE of any signal in the unlicensed frequency band, execute the second monitoring mode to determine whether the unlicensed frequency band is in use, the second monitoring performed without transmitting any signal in the unlicensed frequency band, the second monitoring mode of the unlicensed frequency band comprising reduced sensing of the unlicensed frequency band as compared to the first monitoring mode, the first monitoring mode and the second monitoring mode measuring the same characteristics of the unlicensed frequency band; and in response to a determination from the second monitoring that the unlicensed frequency band is not in use, transmit the second signal to the base station in the unlicensed frequency band.

8. The apparatus of claim 7, wherein the first monitoring mode and the second monitoring mode measure the characteristic in accordance with the same radio access technology.

* * * * *